April 17, 1951  S. A. HARRIS  2,549,598
FUEL MODIFYING DEVICE FOR INTERNAL-COMBUSTION ENGINES
Filed Feb. 4, 1949  2 Sheets-Sheet 2
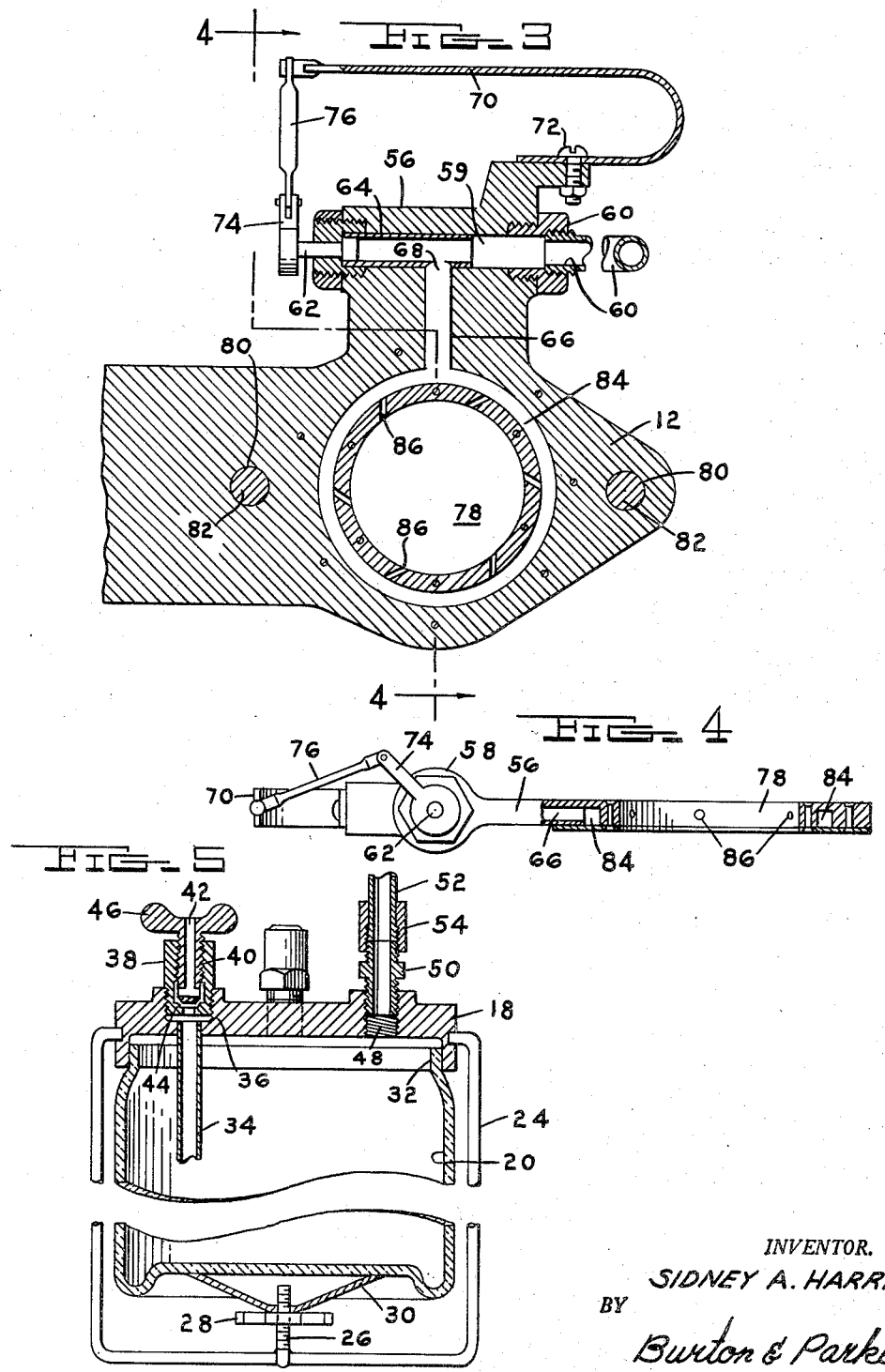
INVENTOR.
SIDNEY A. HARRIS
BY
Burton & Parker
ATTORNEYS Patented Apr. 17, 1951

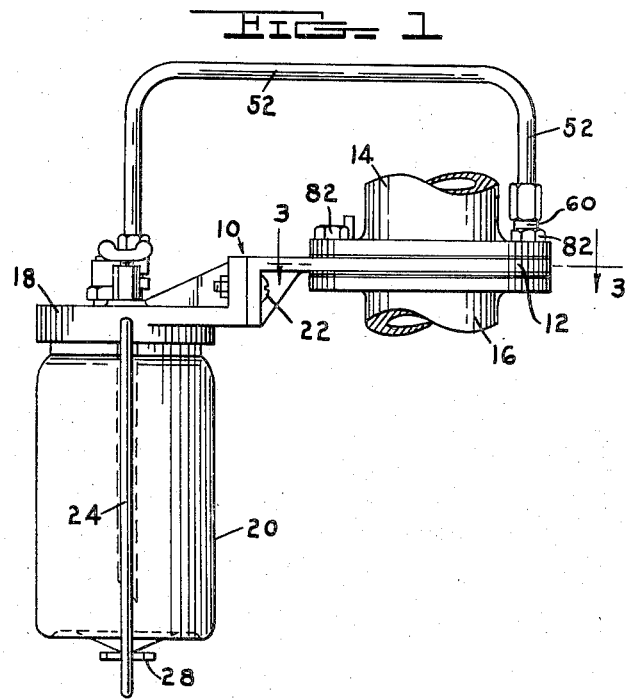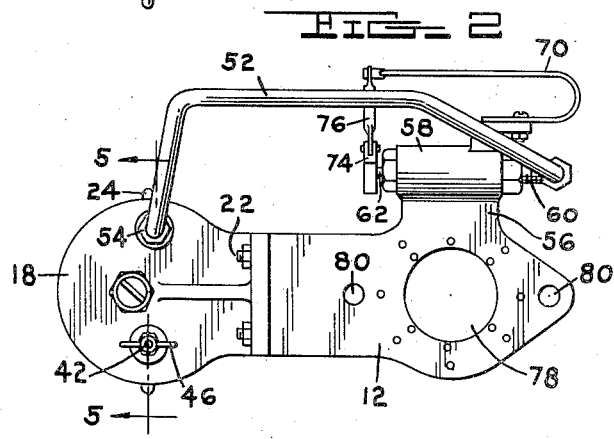

2,549,598

UNITED STATES PATENT OFFICE 2,549,598

FUEL MODIFYING DEVICE FOR INTERNAL-COMBUSTION ENGINES

Sidney A. Harris, Flint, Mich.

Application February 4, 1949, Serial No. 74,610

2 Claims. (Cl. 123—196)

This invention relates to the feeding of fuel to internal combustion engines and particularly to a self-contained attachable unit adapted to modify the fuel used by such engines.

An important object of this invention is to provide an improved apparatus for economizing in the amount of fuel utilized by internal combustion engines, for improving the operating efficiency thereof, and for lubricating certain parts of the engine to which they are attached. Another important object of the invention is to provide an apparatus for mixing vaporized oil with the fuel of the engine and for regulating the amount of such oil in accordance with the temperature of the engine. A further important object of the invention is to provide a fuel saving apparatus of this character which is designed in a novel manner for installation and removal as a unit, and which is adapted for use on various types of conventional internal combustion engines.

In carrying out the invention, there is provided a vessel or receptacle containing an oil content in liquid state through which air is caused to be passed. The resulting mixture of air and oil is delivered to the fuel intake of the engine upon which the apparatus is installed, the amount of such mixture being regulated in a novel manner in accordance with the operating temperature of the engine. An important novel feature of the invention is the provision of a single supporting bracket member which is common to all the parts of the apparatus and connects the same together into a unitary assembly for quick and convenient installation and removal. The single supporting bracket member is so designed at one end for interposition between the conventional carburetor and intake manifold of internal combustion engines and is so shaped in a novel manner for introducing the oil laden air in a swirling motion into the fuel conduit between the carburetor and the manifold. The bracket is further so designed at its opposite end for supporting an oil containing vessel or receptacle and holds the same immediately adjacent to the carburetor. Auxiliary control devices, such as a valve and a thermo-responsive element, are also carried on the bracket member. The resulting structure is a compact, self operating unit which is capable of being readily installed upon the various types of internal combustion engines without difficulty and without the need of skilled labor.

Various other objects, advantages and meritorious features of this invention will become more fully apparent from the following specification, appended claims, and accompanying drawings wherein:

Fig. 1 is a side elevation of a device constructed in accordance with this invention and shown installed in place between the conventional carburetor fuel duct and the intake manifold, Fig. 2 is a top view of the device shown removed from its connection to an internal combustion engine, Fig. 3 is a horizontal sectional view taken along line 3—3 of Fig. 1, Fig. 4 is a view, partly in elevation and partly in cross section, taken along line 4—4 of Fig. 3, and Fig. 5 is a vertical sectional view of the oil containing reservoir taken along line 5—5 of Fig. 2.

In general, the apparatus comprises a supporting member or bracket upon which the various operating parts are supported. The bracket member serves to tie the various parts of the apparatus together into a unitary assembly in order that the device may be readily installed and removed from an internal combustion engine. The parts are supported on the bracket member in such a manner as to avoid interference with any structure of a conventional internal combustion engine and when attached thereto forms a compact, self-operating assembly.

The bracket member is generally indicated at 10 and comprises one end section 12 in the form of a thin metal block which is shaped to be received between the discharge throat of a conventional carburetor and the fuel entering conduit of a conventional intake manifold and be tightly secured thereto. The throat of such carburetor is indicated at 14 in Fig. 1 and the fuel inlet conduit of the intake manifold is indicated at 16. The opposite end section of the bracket member 10 is indicated at 18 and is shaped to support the vessel or receptacle 20 in which oil in liquid state is contained. Although the bracket member may be constructed in one piece it is herein shown formed of two end sections 12 and 18 connected together in endwise abutting relationship by bolts 22.

The vessel or receptacle 20 in which the oil is contained is preferably a glass reservoir or jar in order to render the oil content visible from the outside. The glass jar 20 as shown in Figs. 1 and 5 is supported in suspended relationship on the end section 18 of the bracket by means of a U-shaped wire frame 24. The upper ends of the wire frame are swingably secured to the end section 18 of the bracket member and the closed end thereof extends around the bottom of the jar in slight spaced relationship thereto. Carried by the closed end of the wire frame is an upwardly projecting externally threaded member 26 upon which an exteriorly indented nut 28 is threaded. The upper face of the nut bears against an outwardly flaring member 30 which abuts the bottom of the jar and when the nut 28 is threaded upwardly holds the jar in locked position to the bracket member. The underside portion of the end section 18 of the bracket is circularly recessed to receive a neck 32 of the jar and seal the same against the entrance of air at this point. Upon loosening the nut 28, the wire frame 24 may be swung to either side allowing the glass receptacle to be removed for refilling with oil.

Air is caused to be passed through the oil content of the receptacle 20 in order to pick up particles of oil and carry the same therewith to the opposite end of the bracket member. For this purpose, there is provided an air inlet tube 34 fixed to the end section 18 of the bracket and depending therefrom to a level below that of the oil content in the receptacle. The end section 18 as shown in Fig. 5 is provided with an internally threaded bore 36 opening into alignment with the tube 34 in which is threaded an annular member or gland 38. Threaded into the gland is a valve member 40 having an axial bore 42 through which air enters. The lower end of the bore 42 is formed into the shape of a T as shown in Fig. 5 and discharges air into an annular clearance formed around the valve member from whence it flows into the tube 34. Rotatable adjustment of the valve member 40 will vary the distance of its lower end with respect to the valve seat 44 and thereby vary the amount of air permitted to enter the tube 34. Adjustment of the valve member is facilitated by the provision of wings 46 on the upper end of the valve member.

The controlled amount of air thus introduced into the oil content of the receptacle 20 is drawn out through a port 48 offset to the air inlet. Received in this port is an axially bored fitting 50 which projects above the end section 18 of the bracket and receives on the upper end thereof a tube 52. Any suitable means such as the sleeve 54 may be provided for making a tight connection at this point to prevent leakage of air.

As will be described hereinafter the tube 52 communicates with the fuel delivery duct leading between the carburetor and the manifold and during the operation of the engine a suction is developed which induces air to enter the tube 34, flow through the oil content of the receptacle 20, and discharge upwardly through the tube 52 carrying particles of oil therewith.

An important novel feature of the invention is the provision of means for regulating the amount of oil laden air introduced into the carburetor fuel mixture in accordance with the temperature of the engine. As shown particularly in Figs. 3 and 4, the insert block 12 of the bracket, which is introduced between the discharge throat of the carburetor and the intake manifold, is provided with a laterally extending flange or platform 56. The outer end section of the platform 45 is thickened as at 58 in Fig. 4 and provided with a circular bore or passage 59 extending parallel to the longitudinal dimension of the bracket member. The passage 59 opens out on opposite ends of the platform and connected to one end thereof is the tube 52 as shown in Fig. 2. This is preferably accomplished by providing a suitable L-shaped tubular fitting 60 which is connected at one end to the tube 52 and is threadedly connected into the passage 59 at the other end.

Extending into the opposite end of the passage 59 is a rotatable control member 62 to the inner end of which is fixed a sleeve 64 which functions as a valve. At substantially the center of the passage 59 a bore or branch passage 66 provides communication with the fuel delivery duct between the carburetor and the intake manifold. As shown in Fig. 3, the branch passage 66 extends perpendicularly to the axis of the passage 58 and in the plane of the platform 56. The valve sleeve 64 extends beyond the branch passage 66 and is provided with a port 68 intermediate its ends which in one position of the sleeve fully registers with the branch passage 66. However, as the sleeve is rotated from this position the port 68 progressively moves out of registration with passage 66 and decreases the amount of oil laden air flowing through the passage 59, sleeve 64 and the duct 66.

Rotational movement of the valve sleeve 64 is controlled by thermostatic means responsive to the heat of the engine. As shown in Figs. 3 and 4, there is mounted on the platform 56 a flexible thermostatic element 70 which may be a bimetallic blade. One end of the blade is fixed to the platform as at 72. The blade is bent intermediate its ends to dispose the opposite end thereof in offset relationship to the control member 62. Fixed to the control member is a crank arm 74 which as shown in Fig. 4 extends at an upward inclination to the plane of the insert block 12. A link 76 pivoted at one end to the crank arm 74 and at the opposite end to the bimetallic blade 70 operatively connects the blade with the valve sleeve for controlling the rotation of the latter in response to temperature changes. The parts are so arranged that when the engine is cold the port 68 of the valve sleeve is out of registration with the duct 66, but as the engine warms up the thermostatic element 70 flexes and through the link 76 causes the valve sleeve to rotate and progressively bring port 68 into registration with the duct 66. In the normal operating condition of the engine, the port 68 will be fully in registration with the duct 66 allowing the maximum amount of oil laden air to enter the branch passage 66 and mix with the fuel of the engine.

The insert block 12 of the bracket member is initially formed with aperture 78 therethrough, the inside dimension of which is similar to that of the fuel passage between the carburetor and the intake manifold. The insert block is further provided with bored holes 80—80 on diametrically opposite sides of the passage 78 which are adapted to align with the bolt receiving holes normally used to connect the carburetor with the intake manifold. Extending through these holes are bolts 82 which as shown in Fig. 1 serve to connect the conventional flange portions of the carburetor throat 14 and the inlet passage 16 of the manifold. In this manner the insert block is interposed between the carburetor and the manifold with the aperture 78 thereof in alignment with the fuel delivery passage between the carburetor and the manifold.

Another important feature of the invention is the provision for swirling the oil laden air as it mixes with the fuel passing between the carburetor and the intake manifold. As shown in Fig. 3, the duct 66 opens into an annular passage 84 which is larger in diameter than the carburetor throat 14 or the intake 16 of the manifold. The inner wall of the annular chamber 84 is provided with a plurality of circularly spaced apart discharge openings 86 through which the oil laden air in the chamber is passed for mixture with the fuel. The openings 86, as shown in Fig. 3, are each arranged at an angle to the radius between same and the center of the fuel passage. The angle is such that the oil laden air is discharged from each opening in the form of a small jet approximately tangentially into the fuel stream between the carburetor and the manifold. The openings 86 are so arranged that the oil laden air discharged thereby sets up a swirling motion in the fuel flowing through the passage 78 and intimately mixes the oil laden air with the fuel as it is delivered to the intake manifold.

As a result of this invention there is provided a compact readily installable and removable unit for introducing oil laden air into the fuel stream of a conventional internal combustion engine. All the parts of the device are supported on a single bracket member and are so disposed thereon that when installed there will be no interference with the existing parts of the engine. One end of the bracket member is shaped for mounting between the conventional carburetor and intake manifold of the engine and when so installed for delivering in a mixture of oil and air in a swirling motion into the fuel stream. The opposite end of the bracket member supports the air reservoir in suspended relation thereto and air intake and delivery means supported by the member extends from the reservoir to the opposite mounted end of the bracket. Supported by the bracket member in juxtaposition to the engine to be effected by the temperature thereof is a thermostatic element. This element is operatively connected to a valve also supported by the bracket member which regulates the amount of oil laden air introduced into the fuel stream in accordance with the change in temperature of the engine. The unitary character of the device renders it quickly installable on existing engines, the only labor required being to disconnect the carburetor from the intake manifold to receive the thin block section of the bracket and thereafter connect the parts together in their original manner.

In operation, the oil laden air reduces the amount of fuel necessary for the operation of the engine thus economizing in the use of the fuel. In addition, the oil lubricates the upper parts of the engine rendering them more efficient in operation.

What I claim is:

1. In a fuel modifying device for internal combustion engines, the combination of a supporting bracket member having one end thereof apertured and shaped to be interposed between the carburetor and the intake manifold of an internal combustion engine, a closed transparent vessel suspended from the opposite end of the bracket member and containing an oil content in liquid state therein, conduit means for passing air through the oil content of the vessel and for delivering the resulting mixture of air and oil to said first mentioned end of the bracket member in offset relationship to the aperture thereof, a passage in said first mentioned end of the bracket member communicating with said conduit means and with said aperture and adapted to deliver the oil and air mixture through a wall of said aperture and into the fuel flowing between the carburetor and the intake manifold, a rotary valve in said passage for regulating the amount of oil and air mixture passing therethrough, a thermostatic blade secured at one end to said bracket member and adapted to flex out of its normal plane in response to temperature changes, and means operatively connecting the opposite end of the thermostatic blade to the valve member for rotating the latter in response to temperature changes.

2. In a fuel modifying device for internal combustion engines, the combination of a supporting bracket member having one end section thereof relatively thin and flat and shaped for interposition between the carburetor and the intake manifold, said end section having an aperture therethrough adapted to align with the communicating fuel passage between the carburetor and the intake manifold, a transparent vessel opened at its upper end and adapted to contain an oil content in a liquid state, means sealingly securing the upper end of the vessel to the underside of the opposite end section of the bracket member so as to form a cap for the vessel, an air admitting conduit opening through the cap end section of the bracket member and extending downwardly into the vessel for introducing air into the oil content thereof, a valve on the upper side of the cap end section of the bracket member for regulating the amount of air admitted to the vessel's content, a second conduit communicating at one end with the upper portion of the vessel to receive an oil and air mixture therefrom and communicating at its other end with said aperture of the bracket member for delivering such mixture to the aperture, a rotary valve in said second conduit for regulating the amount of oil and air mixture flowing therethrough, a thermostatic blade secured at one end to the bracket member and adapted in response to temperature changes to flex out of its normal plane, and means connecting the opposite end of the blade to the rotary valve and operable to progressively open the valve in proportion to the increase in temperature.

SIDNEY A. HARRIS.

REFERENCES CITED

The following references are of record in the file of this patent:

UNITED STATES PATENTS

| Number | Name | Date |
|---|---|---|
| 1,767,461 | Kacena | June 24, 1930 |
| 1,883,848 | Van Tuyl | Oct. 18, 1932 |
| 2,085,974 | Harris | July 6, 1937 |
| 2,090,983 | O'Hara | Aug. 24, 1937 |
| 2,182,874 | Kowalski | Dec. 12, 1939 |
| 2,194,274 | Boyd | Mar. 19, 1940 |